United States Patent Office 3,430,030
Patented Feb. 25, 1969

3,430,030
PROCESS AND APPARATUS FOR THE LONGITUDINAL SEAM WELDING OF METAL BANDS
Josef Mittermuller, Berndorf, Austria, assignor to Vereinigte Metallwerke Ranshofen-Berndorf Aktiengesellschaft, Berndorf, Austria, a corporation of Austria
Filed Jan. 4, 1967, Ser. No. 607,209
Claims priority, application Austria, Jan. 5, 1966, A 83/66
U.S. Cl. 219—124                    9 Claims
Int. Cl. B23k 9/12; B23q 1/06

ABSTRACT OF THE DISCLOSURE

A longitudinal seam is formed between a pair of metal webs (e.g. endless steel bands) which are progressively advanced past a welding torch trained upon their junction, the two webs being interconnected ahead of the welding point by a plurality of longitudinally spaced releasable light-weight clamps which move forwardly with the webs and are periodically released, one at a time, to be moved back along the webs and retightened thereon; thus the webs remain clamped to each other at one or more locations even during the periodic relocation of the several fasteners.

My present invention relates to a method of and an apparatus for welding a pair of metal webs, such as two open or endless steel bands, along adjoining longitudinal edges.

The general object of my invention is to provide a process and means for so welding such webs that a precisely uniform, nonporous and level seam is formed, with no change of the relative position of the webs at the welding point.

This object is realized, pursuant to an aspect of my invention, by the provision of a plurality of independent and preferably light-weight fasteners which clamp the two webs to each other at several longitudinally spaced locations, these fasteners riding with the webs as the latter progressively advance toward the welding point where a torch or an electrode is trained upon their junction. Periodically, as each fastener advances a predetermined distance from its starting point, it is released and returned to that point while the remaining fastener or fasteners are held engaged until the first-mentioned fastener is retightened, this releasing and reclamping operation being performed cyclically for all the fasteners. Advantageously, the more forwardly located fastener or fasteners are moved back until they strike the immediately succeeding fasteners, still clamped to the webs, which thus serve as temporary abutments therefor.

According to another aspect of my invention, an apparatus designed to carry out the aforedesignated method comprises a frame which carries the welding head and is traversed by the two parallel webs as they move between a pair of supporting rollers of which at least one is driven to advance the webs; preferably, the frame is laterally slidable so as to adjust itself to sideway shifts in the position of the moving webs while still preventing the webs from separating at the welding point.

The periodic opening and reclosing of the fasteners may be performed manually but, advantageously, is brought about automatically, e.g. by electromagnetic, hydraulic or pneumatic means known per se.

The invention will be described hereinafter in greater detail with reference to the accompanying drawing in which:

FIG. 3 is a face view of a fastener representative of several such devices shown in FIG. 1;

Figure 1:
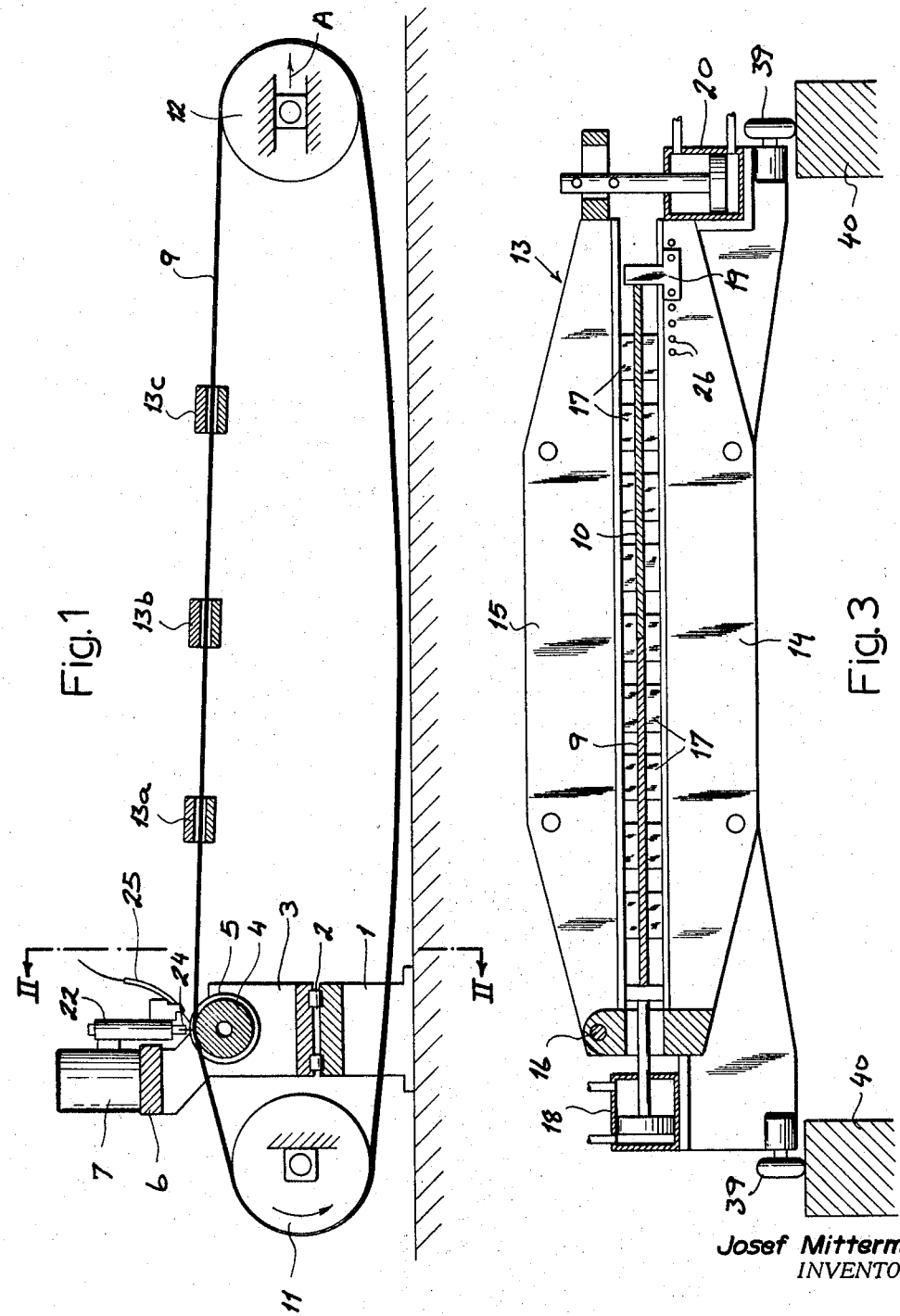
FIG. 1 is a somewhat diagrammatic side-elevational view of an apparatus according to the invention.
Figure 2:
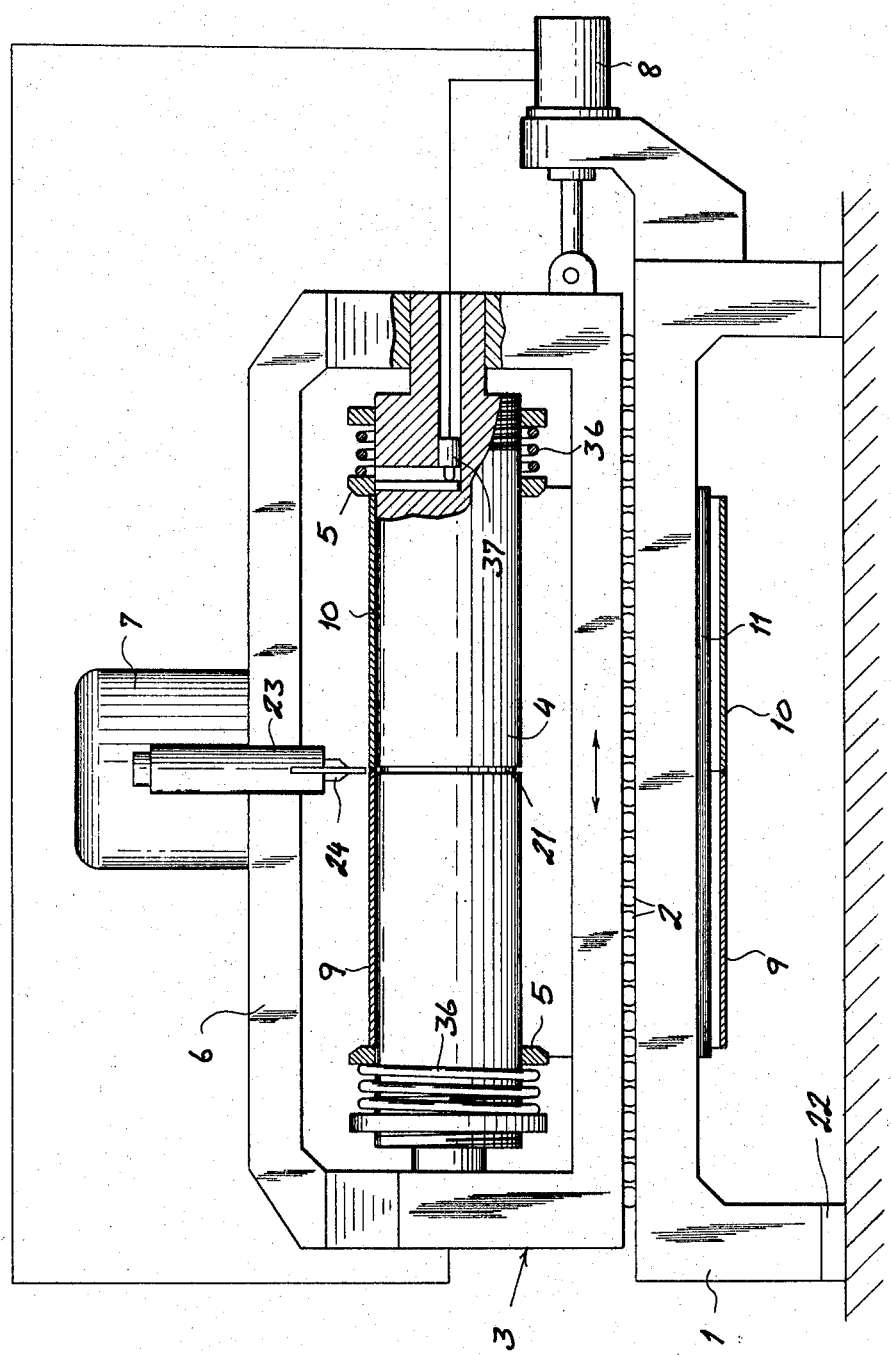
FIG. 2 is a view taken on the line II—II of FIG. 1 but drawn to a larger scale.
Figure 4:
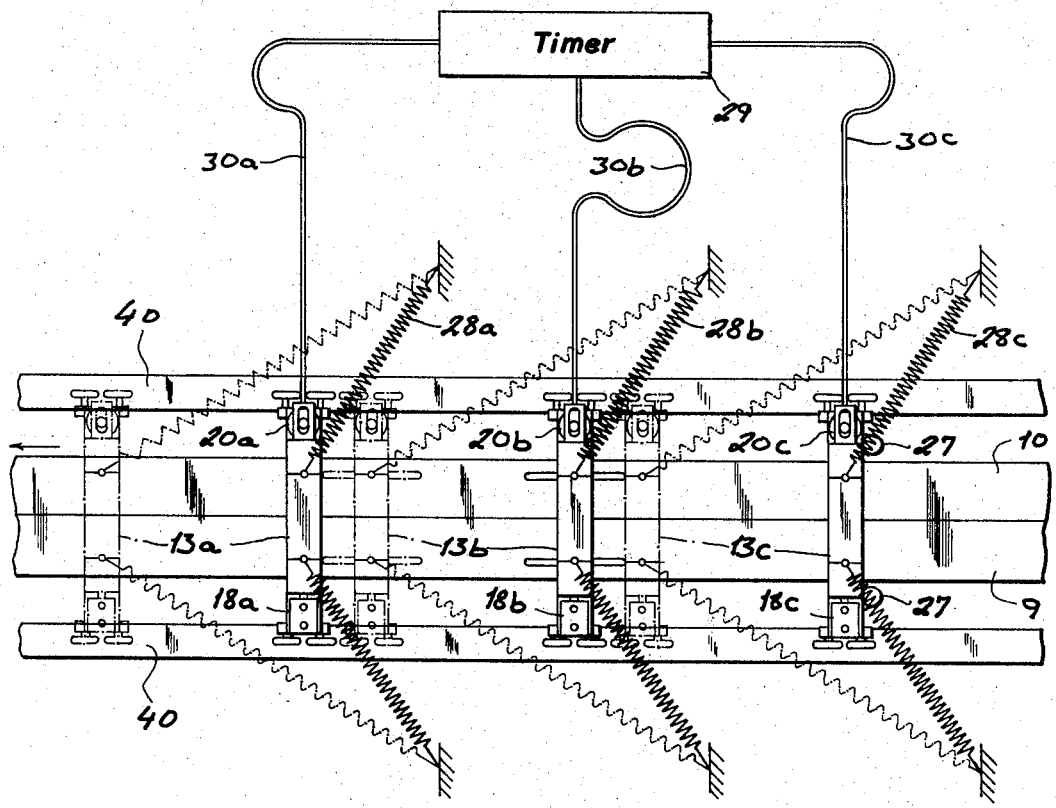
FIG. 4 is a partial top view of the apparatus shown in FIG. 1.

The apparatus shown in FIGS. 1, 2 and 4 comprises a stationary base 1 on which a frame 3 is laterally slidable through the intermediary of interposed rollers 2. Journaled in frame 3 is a roller 4 provided with a central peripheral groove 21; two collars 5, adjustably mounted on roller 4, form lateral guides for a pair of endless steel bands 9, 10 which pass through the frame 3 and rest on roller 4 so that their common edge lines up with groove 21. The top 6 of frame 3 is removable to facilitate the introduction and withdrawal of the endless bands; for the same purpose, the base 1 can be lifted off its foundation 22. Collars 5 are limitedly shiftable on roller 4, against the force of springs 36, and act upon sensitive switches 37 (only one shown) which control a servomotor 8 linked with frame 3. A welding head 23, provided with an arc-welding electrode 24 aligned with groove 21, is carried on a boss 7 above frame 3 and trained upon the junction of the two bands; a welding rod 25 terminates at the junction which is sheathed in a flow of protective gas.

The bands 9, 10 are wound on two end rollers 11, 12 roller 11 being positively driven by a motor not shown whereas roller 12 is horizontally displaceable in the direction of arrow A to tension the bands. The lateral slidability of frame 3 on base 1, with a positive assist from servomotor 8 in response to lateral web pressure upon collars 5, enables this frame 2 to follow minor sideways excursions of the bands in their continuous movement around the rollers 4, 11, 12.

A plurality of releasable fasteners 13a, 13b, 13c engage the bands 9, 10 at longitudinally spaced locations ahead of the welding nozzle 24. Each of these fasteners, one of which is illustrated in detail at 13 in FIG. 3, comprises a pair of clamp jaws 14, 15 of light-weight material (e.g. aluminum) which are hinged together at 16 and are provided with coacting teeth 17 bearing upon the bands 9 and 10. An actuator 20, here shown as a fluid-operated piston, serves to tighten and release the jaws 14, 15 while a similar actuator 18 pushes the bands 9, 10 against a stop 19 whereby the bands are gripped both laterally and from top and bottom. Stop 19 may be reset along jaws 14 and 15, with the aid of pins passing through holes 26, to accommodate bands or webs of different width. Wheel 39 movably support each fastener on a pair of tracks 40 as shown in FIG. 4.

In operation, the fasteners 13a, 13b, 13c advance toward the frame 3 together with the bands 9, 10 onto which they are clamped. As the fastener 13a approaches the welding point (dot-dash lines in FIG. 4), it is released by the reversal of fluid pressure in its hydraulic or pneumatic actuators 19a, 20a and returned to its starting position in which it is arrested by the fastener 20b having advanced concurrently therewith. Upon a retightening of fastener 13a, fastener 13b is similarly released and reset to a starting position in which it strikes the fastener 13c. Finally, fastener 13c is similarly reset against a fixed stop here shown as a pair of studs 27.

The aforedescribed operations may be carried out with the aid of springs 28a, 28b, 28c which return the respective fasteners to their starting positions as soon as they have been detached from the webs 9, 10. A timer 29 may control the automatic admission of operating fluid to the pistons of actuators 18a, 18b, 18c and 20a, 20b, 20c of the fasteners; as illustrated in FIG. 4 for the last-named actuators, they may be connected to a valve system within the timer by flexible conduits 30a, 30b, 30c.

Figure 5:
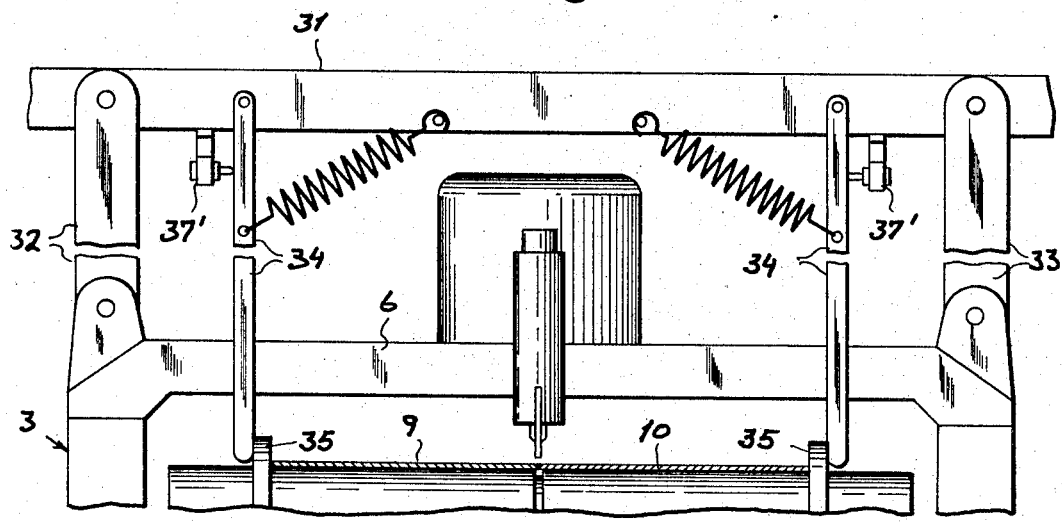
FIG. 5 is a fragmentary view similar to FIG. 2, showing a partial modification.

In FIG. 5 I have shown a modified mounting for the laterally movable frame 3 which is here suspended from an overhead support 31 by a parallelogrammatic linkage comprising a pair of hinged arms 32, 33; the length of these arms should, of course, be sufficient to maintain the bands 9, 10 in substantially their original plane upon a lateral swinging of the frame. FIG. 5 also shows the replacement of the collars 5 of FIG. 2 by guide rollers 35 supported via rods 34 on the stationary beam 31; these guide rollers, like the collars 5, should also be laterally adjustable to accommodate bands of various widths. Sensitive switches 37' respond to outward swings of rods 34 to recenter the frame 3 with reference to bands 9, 10, in response to lateral pressure, by actuating a reversible servomotor as shown at 8 in FIG. 2.

Other modifications of the system shown and described are, of course, possible without departing from the spirit and scope of my invention as defined in the appended claims. Thus, for example, the endless bands 9, 10 may be replaced by open-ended webs unwound from roller 12 and wound upon roller 11.

I claim:
1. A method of welding a pair of metal webs along adjoining longitudinal edges, comprising the steps of concurrently and progressively moving said webs alongside each other past a welding head, temporarily clamping said strips in coplanar and adjoining relationship ahead of said welding head at a plurality of longitudinally spaced locations by fasteners moving with the webs, periodically releasing said fasteners one at a time and relocating each fastener farther back along said webs prior to reclamping same, and keeping said welding head trained upon the longitudinal junction of said webs for producing a continuous welding seam therealong.

2. A method as defined in claim 1 wherein use is made of at least three fasteners, the periodic releasing and reclamping thereof occurring in cyclic succession.

3. A method as defined in claim 1 wherein every fastener except the last one is reset to a starting position in contact with the immediately following fastener prior to a resetting of the latter.

4. An apparatus for carrying out the method of claim 1, comprising a support, feed means for progressively moving a pair of metal webs alongside each other past said support, a welding head on said support trained upon a longitudinal junction of said webs for producing a continuous welding seam therealong, a plurality of fasteners independently releasable and engageable with said webs at longitudinally spaced locations ahead of said welding head, and means for periodically releasing said fasteners one at a time, relocating each fastener farther back along said webs and retightening same before releasing another of said fasteners.

5. An apparatus as defined in claim 4 wherein said support comprises a frame traversed by said webs and provided with lateral guide means therefor.

6. An apparatus as defined in claim 5 wherein said frame is laterally shiftable.

7. An apparatus as defined in claim 6, further comprising a servomotor responsive to lateral pressure of said webs for assisting the shifting of said frame.

8. An apparatus as defined in claim 4 wherein said means comprises fluid-operated actuators.

9. An apparatus as defined in claim 4 wherein each of said fasteners comprises a pair of clamp jaws provided with coacting teeth.

References Cited
UNITED STATES PATENTS

| | | | |
|---|---|---|---|
| 1,981,499 | 11/1934 | Francis | 269—56 |
| 3,191,843 | 6/1965 | Tomkins | 269—56 |
| 3,319,038 | 5/1967 | Meister et al. | 219—80 |

RICHARD M. WOOD, *Primary Examiner.*

L. A. SCHUTZMAN, *Assistant Examiner.*

U.S. Cl. X.R.

219—80; 269—56